Jan. 2, 1940.                A. G. DEAN                 2,185,974
                             TRACTOR UNIT
                           Filed May 3, 1937            2 Sheets-Sheet 1
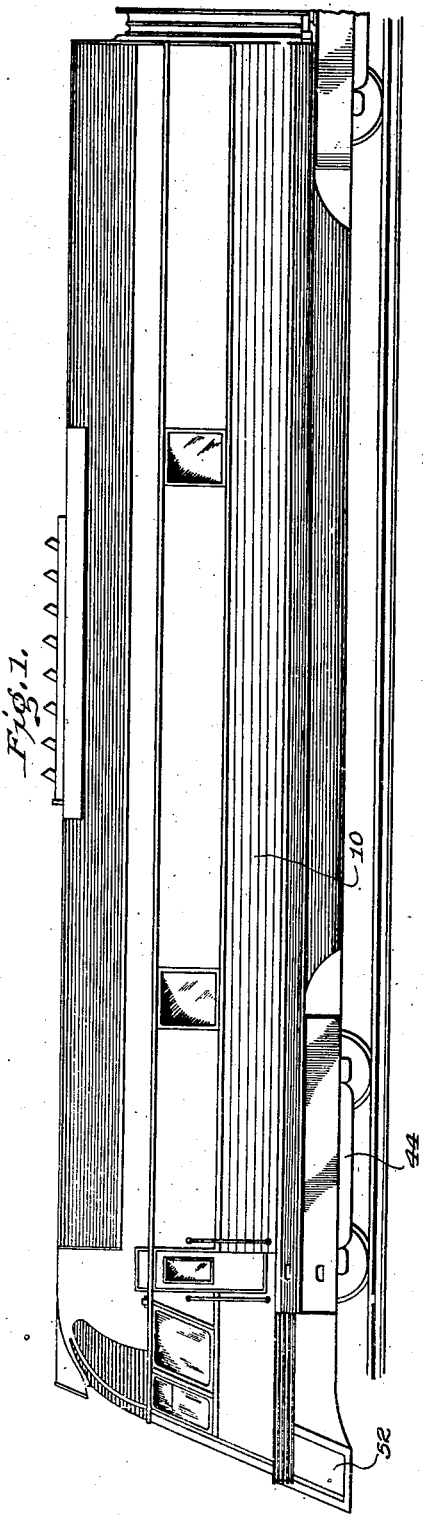
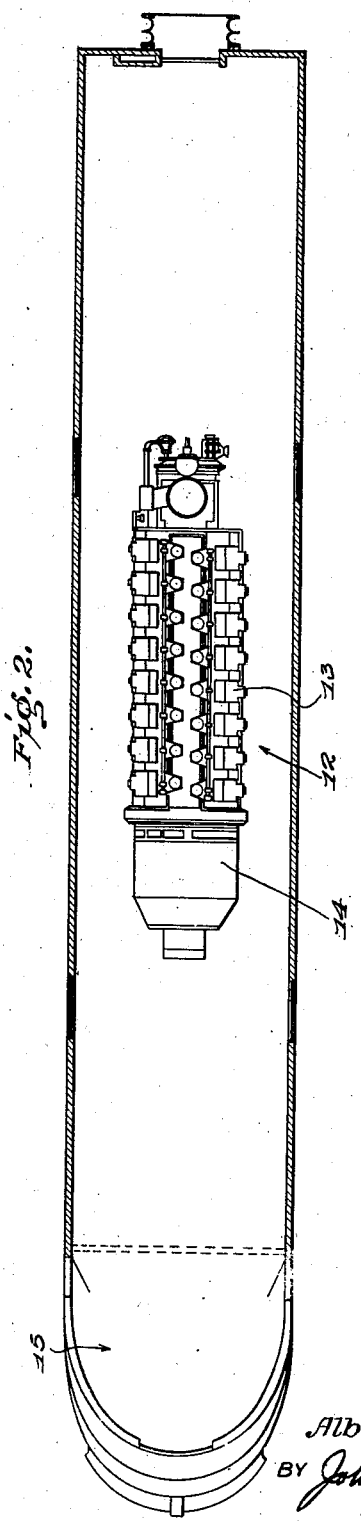
INVENTOR.
Albert G. Dean
BY John P. Tarbox
ATTORNEY.

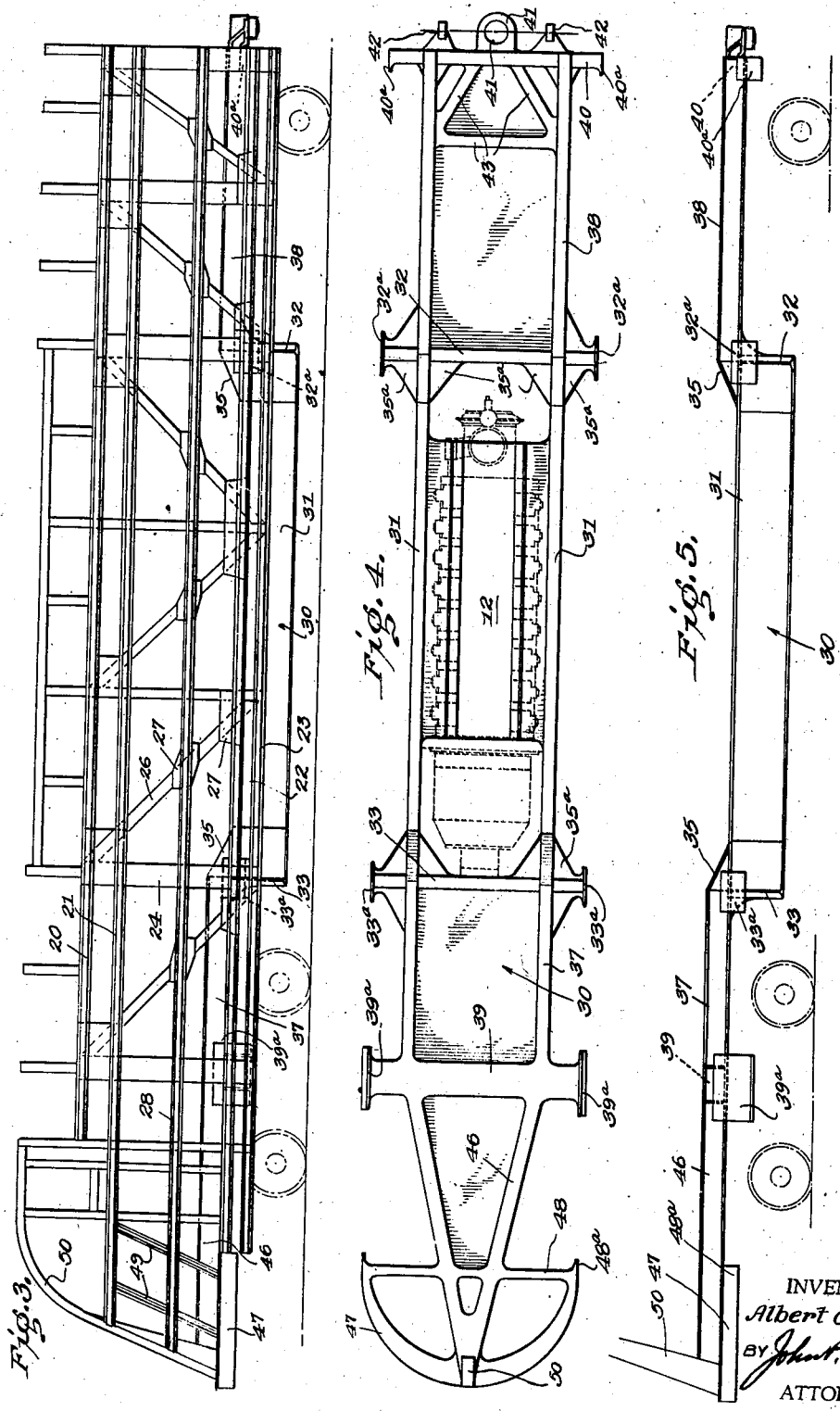

Patented Jan. 2, 1940

2,185,974

UNITED STATES PATENT OFFICE 2,185,974

TRACTOR UNIT

Albert G. Dean, Narberth, Pa., assignor to Edward G. Budd Manufacturing Company, Philadelphia, Pa., a corporation of Pennsylvania Application May 3, 1937, Serial No. 140,328

10 Claims. (Cl. 105—414)

This invention relates to improvements in vehicles and more particularly to an improved supporting structure for a rail car tractor unit.

One of the principal objects of the invention is to reduce the dead load weight of the supporting structure of a rail car tractor unit for an increased ratio of available power with respect to the gross load.

Another object of the invention is to provide an improved vehicle body for a self-contained power plant tractor unit in which the power plant is supported by the body.

Another object of the invention is to provide an improved form of underframe structure for a self-contained power plant for a rail car tractor unit in which the underframe is primarily adapted to resist longitudinal loads with the vertical loads thereon supported by other body members.

Further objects and advantages of the invention will appear from the following disclosure of a preferred form of embodiment thereof taken in connection with the attached drawings in which, Fig. 1 is a side elevation of a tractor unit of the semi-articulated type;

Fig. 2 is a horizontal section showing the general location of the power plant;

Fig. 3 is an elevation of the framework of the body structure;

Fig. 4 is a plan view of the underframe with the power plant shown in dotted line position; and Fig. 5 is a side elevation of the underframe shown in Fig. 4.

Rail car tractor units of the self-contained power plant type commonly have an internal combustion engine, and/or generator or similar power plant which occupies a substantial part of the car body and becomes its principal weight. Heretofore, such power plants have been built on very substantial underframes, and the superstructure added in any suitable manner. In such structures, especially with the increasing size of power plants, the gross weight becomes so great that minimum size supporting trucks can no longer be used.

I find that a redistribution of the loads makes it possible to materially reduce the dead load of the supporting structure and in fact, I am able to save in the neighborhood of several thousands of pounds of body weight as compared to the best prior practice. The increased ratio of horse power to load possible, in accordance with my invention, permits increases of the power plant size on the same trucks for longer trains, or the same power will be more effective on the same size trains. Operating economies are noticeable in each case.

A preferred form of embodiment of my invention is shown as applied to the rail car tractor unit 10 which is provided with a suitable power plant 12 having a prime mover 13 and generator 14. Such power plant usually requires certain auxiliary equipment (not shown) but it constitutes the major load of the tractor unit. The available floor area within the tractor unit 10 is adapted to receive the auxiliary equipment and to provide a suitable operator's compartment generally indicated at 15.

The power plant 12 is directly supported by the underframe, generally indicated at 30 in Figs. 5 and 4, which underframe is provided with longitudinal power plant supporting beams 31, such beams being of substantial depth and normally being necessary where the power plant itself is not inherently rigid but not being necessary if such strength is possessed by the power plant itself. These beams are only necessary throughout the power plant supporting region between the needle beams 32 and 33 which extend transversely from side to side of the body and are secured thereto as hereinafter described.

The main underframe members 37 and 38 are also tied into the beams 31 at the needle beams 32 and 33, as by vertical and horizontal webbing, generally indicated at 35 and 35a. These members 37 and 38 extend to the bolster members 39 and 40 and are primarily columns, being of less depth than the power plant supporting beams 31. If no deep beams 31 were necessary, in view of the use of an inherently strong power plant, the columns 37 and 38 would extend from the front bolster to the rear bolster.

The forward bolster member 39 is mounted over a supporting truck, generally indicated at 44 and, if a semi-articulated tractor unit is provided, the bolster member 40 will be of the articulated type having the center sill bearing 41 and side bearings 42, and with the parts suitably braced into the longitudinal beams 38 by the bracing generally indicated at 43. It will be understood that the transverse member 40 may be a bolster similar to the bolster 39 and carried over a truck as is the bolster 39. The semi-articulated form of construction, as shown, does not have the load capacity of the non-articulated unit in view of the smaller number of supporting axles.

The transverse members 32, 33, 39 and 40 each have substantially flat, large flanges 32a, 33a, 39a and 40a respectively by which such members are effectively anchored to the side frames. The side frames are beams, preferably of truss type, the upper chord of which includes longitudinal members 20 and 21 with the lower chords including members 22 and 23. The posts or struts 24 are secured to the respective chord members and may be reinforced by suitable diagonals 26 joined internally and externally to the posts and chords by gussets 27. The belt rail is generally indicated at 28.

Between the needle beams 32 and 33, the relatively very deep power plant supporting beams 31 serve as complete power plant supports and the side frames have no substantial reaction from the power plant, but merely serve to support the body and to take longitudinal loads. The side frames directly carry the power plant at the needle beams, however, and transfer the vertical loads from the power plant and the underframe section 31, if needed, to the supporting bolster members 39 and 40. As the underframe need not be rigid throughout its length, it is thus possible to use a very much lighter weight underframe beam and this materially improves clearance conditions. The side frame is effectively a very deep beam for vertical load reactions and the underframe can be more efficiently adapted to resist direct longitudinal loads of buffing and draft. Each element carries its load in the most efficient manner.

The power plant, being suspended by the needle beams from the side frames, has a rigid four point support from suitable panel points of the side frame trusses, and substantially, no secondary power plant reactions can be carried into the side frames. The side frame is adapted to supplement the underframe in respect to resistance of longitudinal loads, as is hereinafter described with respect to the front end structure through which collision loads are primarily directed.

The forward portion of the tractor unit which extends beyond the front bolster 39 may be of any suitable construction, although it is preferably of the general type shown in my co-pending application Serial No. 720,490, filed April 13, 1934. This may include forwardly projecting converging beams 46 which are provided with a bumper 47 of generally arcuate shape, the rearmost ends of which are joined by a transverse member 48 having a suitable flange 48a to which the foremost part of the side frames is attached. As shown in Figure 3, the side frames including the upper chord 21 and belt rail 28 extend through this portion and are joined by suitable posts 49. A center post 50 of longitudinally deep cross section may be provided as an anti-collision member, such post extending up to the roof. This skeleton framework is suitably sheathed and, as generally shown in Fig. 1, the entire front end of the tractor unit may be of arcuate shape in plan and upwardly and rearwardly inclined so as to resemble a hoof-shape. The pilot 52 extends below the bumper portion of the underframe all of which is substantially shown and claimed in a copending application Serial No. 74,542, filed April 15, 1936, and forming no part of the present invention.

While I have shown a preferred form of embodiment of improvement of my invention, I am aware that modifications may be made thereto and I, therefore, desire a broad interpretation of my invention within the scope and spirit of the disclosure herein and of the claims appended hereinafter.

What I claim is:

1. A tractor unit of the class described comprising a pair of truss type side frames supported adjacent the ends thereof and a power plant supporting underframe section, said underframe section being suspended from said side frames, the suspending means comprising needle beams extended outwardly to the side frames and rigidly secured thereto, whereby the vertical loads between the points of suspension of the underframe section are carried by the side frames.

2. A vehicle having a body, means to support said body adjacent its ends, said body including an underframe having a power plant supporting section intermediate said supporting means and including further a pair of side frame trusses carried by parts of the underframe over the supporting means, and means to suspend said power plant supporting section from the body side frame trusses including laterally extending needle beams at the ends of said section rigidly tied into the side frame trusses.

3. A vehicle having a body, means to support said body adjacent its ends, said body including load carrying side frame trusses extending between the points of support, an underframe having a power plant supporting section intermediate said points of support and means to suspend said section from the side frame trusses including lateral extensions at the ends of said section tying into the side frames, said power plant supporting underframe section being relatively short as compared to the length of the body.

4. A vehicle having a body, means to support said body adjacent its ends, said body including an underframe having a power plant supporting section intermediate said supporting means and further including a pair of side frame trusses carried by parts of the underframe over the supporting means, and means to suspend said power plant supporting section from said side frame trusses including lateral extensions from the ends of said power plant supporting section secured to said side frame trusses, the parts of said underframe being primarily adapted to resist draft and buffing loads and the side frame trusses being primarily arranged to carry the vertical loads between the points of support of the body.

5. A tractor unit of the class described comprising a pair of truss type side frames supported adjacent their ends and arranged to carry a major portion of the vertical load between the points of support and a power plant supporting underframe section, said underframe section being suspended from said side frames intermediate their points of support, means to support said side frames, and other underframe portions connecting the side frame supports with the power plant supporting section for resisting longitudinal buffing and draft loads.

6. In a tractor unit of the class described, having supporting means adjacent its ends, a power plant supporting underframe including a plurality of longitudinally extending beams, portions of said beams intermediate the supporting means having deep webs for receiving a power plant, a plurality of needle beams adjacent the ends of said power plant supporting webs and secured thereto, the portions of the longitudinal beams extending from said power plant supporting portions being of substantially less depth, and side wall trusses to carry the vertical load including the weight of the power plant section between the supporting means adjacent the ends of the unit.

7. A tractor unit for a self-contained power plant which comprises body side frame truss structures, means to support said body side frame truss structures adjacent their ends, an underframe structure having an intermediate power plant section supported adjacent its ends by the body side frame truss structures and connecting sections extending, one at each end, from the power plant section to the body supporting means, said power plant section being inherently capable of resisting longitudinal and vertical load reactions, said connecting sections being inherently capable of resisting longitudinal loads and being supplemented by the body side frame trusses in resisting vertical loads, the side frame trusses carrying substantially the entire vertical load of the power plant section.

8. An underframe of a rail car tractor unit having transverse bolsters through which said underframe is supported and having intermediate needle beams between which a self-contained power plant is supported, the portion of said underframe between said needle beams being of relatively great depth and rigidity as compared with the portions beyond the needle beams and of comparatively short length as compared to the distance between the bolsters, and body side wall trusses secured to said underframe in the region of the bolsters and the needle beams and carrying a major portion of the vertical load between the bolsters.

9. A vehicle body supported adjacent its ends on trucks and having a long span between points of support on said trucks, side frame trusses for taking most of the vertical load between said points of support in combination with an underframe comprising through-running longitudinal beams extending between said points of support and disposed intermediate said side frame trusses, said underframe comprising transverse bolsters interconnecting the longitudinal beams and extended laterally thereof and tied into the side frame trusses at said points of support, the intermediate portion of said longitudinal beams, spaced from said bolsters, forming an engine supporting section and transverse needle beams interconnecting the longitudinal beams and the side frame trusses at the ends of said section and the intermediate engine supporting section of said beams being relatively deep vertically and the end portions thereof being relatively shallow whereby the major portion of the vertical loads in the region of the engine section are carried by the side frame trusses.

10. A tractor unit for a self-contained power plant having a unitary underframe and vertical side frame trusses, said underframe having spaced bolsters adjacent its ends, longitudinally extending power plant supporting beams relatively deep vertically in their central portions and relatively shallow adjacent their ends in the region of said bolsters arranged inwardly of the side frame trusses and extending between and connected to said bolsters, means including said bolsters extending laterally from said beams for tying said beams into the side frame trusses in the regions of said bolsters and in regions spaced some distance inwardly thereof, said spaced means tying into the side frame trusses enabling said trusses to carry a major portion of the vertical loads in the region between the bolsters.

ALBERT G. DEAN.